US008041687B2

(12) United States Patent
Chen et al.

(10) Patent No.: US 8,041,687 B2
(45) Date of Patent: Oct. 18, 2011

(54) DYNAMIC GENERATION OF XML SCHEMA FOR BACKEND DRIVEN DATA VALIDATION

(75) Inventors: Yen-Fu Chen, Austin, TX (US); John W. Dunsmoir, Round Rock, TX (US); Mark Louis Feinberg, Smyrna, GA (US); Abhay Pradhan, Austin, TX (US); Hari Shankar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1523 days.

(21) Appl. No.: 10/674,974

(22) Filed: Sep. 30, 2003

(65) Prior Publication Data

US 2005/0071344 A1    Mar. 31, 2005

(51) Int. Cl.
*G06F 17/00* (2006.01)
(52) U.S. Cl. .......................... 707/690; 707/698
(58) Field of Classification Search .................. 707/100, 707/690, 698
See application file for complete search history.

(56) References Cited

U.S. PATENT DOCUMENTS

| | | | |
|---|---|---|---|
| 6,347,307 B1 | 2/2002 | Sandhu et al. ................. 705/35 |
| 6,356,906 B1 | 3/2002 | Lippert et al. ................. 707/10 |
| 6,418,446 B1 | 7/2002 | Lection et al. ............... 707/103 |
| 6,418,448 B1 | 7/2002 | Sarkar ........................ 707/104.1 |
| 6,480,865 B1 | 11/2002 | Lee et al. ...................... 707/523 |
| 6,556,999 B1 | 4/2003 | Kloos et al. .................... 707/10 |
| 6,569,207 B1 | 5/2003 | Sundaresan ................... 715/513 |
| 6,609,133 B2* | 8/2003 | Ng et al. .................. 707/103 Y |
| 7,016,906 B1* | 3/2006 | Janzig et al. .................. 707/101 |
| 7,051,041 B1* | 5/2006 | Miller ........................... 707/102 |
| 2002/0120685 A1* | 8/2002 | Srivastava et al. ............ 709/203 |

OTHER PUBLICATIONS

Andany, Josè et al. "Management of Schema Evolution in Databases." 17th international conference on Very Large Data Bases. Barcelona, Sep. 1991. pp. 161-170.*
Microsoft® Computer Dictionary 574 (5th ed. 2002).*

* cited by examiner

*Primary Examiner* — Robert Timblin
(74) *Attorney, Agent, or Firm* — Yee & Associates, P.C.; Mark C. Vallone; Rudolf O. Siegesmund

(57) ABSTRACT

The present invention comprises a Schema Generation Program (SGP) and Schema Update Program (SUP). The SGP creates an initial XML Schema and copies the database into a hashtable. At the occurrence of a query interval, the SGP compares the database to the hashtable. If the database is identical to the hashtable, then the SGP resets the query interval and repeats the comparison. If the database and the hashtable are not identical, then the SGP deletes the old hashtable, stores a copy of the database as a new hashtable, and creates a new XML Schema. The XML Schema is stored in the web server so that a registered party may access the XML Schema and check the validity of a group of data before sending the data to the web server as a proposed addition to the database. The SUP notifies registered parties of updates to the XML Schema.

24 Claims, 2 Drawing Sheets

DYNAMIC GENERATION OF XML SCHEMA FOR BACKEND DRIVEN DATA VALIDATION

FIELD OF THE INVENTION

The present invention is related generally to a method for creating an XML Schema and specifically to an improved method for creating an XML Schema in a backend database driven environment.

BACKGROUND OF THE INVENTION

Databases play an important role in the modern business world. Significant amounts of time and resources are expended in creating and managing databases. Additionally, companies are continuously looking for methods to decrease the time and resources spent managing and modifying the databases. One area in which companies expend considerable time and resources is validation of data for entry into a database. Validation is defined as the process of analyzing data to determine whether it conforms to the completeness and consistency parameters defined by the database. In other words, validation is the act of checking to see whether the data meets the database's requirements for data size, type, formatting and so forth. Validation is especially important in backend management of the database. Backend management of a database occurs when the proposed database addition must conform to the database rules.

One tool that database administrators have used to help validate data is an XML Schema. XML is an acronym for eXtensible Markup Language, a condensed form of SGML (Standard Generalized Markup Language). XML lets web developers and designers create customized tags that offer greater flexibility in organizing and presenting information than is possible with the HTML document coding system. XML's simplicity and flexibility have caused industry wide adoption of XML and an increasingly important role for XML in the exchange of a wide variety of data for both client and web applications. Because of the industry wide adoption, XML is the preferred method of packaging data when transmitting information between programs.

With the popularity of 3-tier architecture, backend database management is very important to applications development and is often the key driver for automation, for storing information necessary to make software more flexible, and for making the maintenance process easier. The standardization of XML, combined with the common usage of databases for older and legacy systems, initiated the need for validation when constructing, interpreting, and storing data.

XML is used by database administrators to validate HTML data for entry into the database. More specifically, the XML file that is used to validate the data is called the XML Schema. The XML Schema is formed to define the structure, content, and semantics of XML documents and the defined structure becomes the body of rules used to validate XML files. Thus, an XML Schema, or some similar method of validation, is required to validate data prior to entry into the database when the database is backend driven.

A problem arises when applications are backend driven and require element names or values within the XML to conform with database properties such as table or column names. Developers will either have to create a gigantic XML Schema file that will be used to validate all possible XML Schemas or the developers will have to predefine multiple XML Schemas to serve the same purpose. Both of these foregoing actions will require enormous overhead and maintenance because database properties are often altered. For example, database tables are added or deleted, columns are altered, and any other changes in the database property will require updating the XML Schemas. Updating the XML Schemas may require suspending the application in order to reload the new XML Schemas. Suspending the application is especially difficult when the applications are deployed in a customer's information technology environment.

The prior art contains various methods for creating XML Schemas and persons of ordinary skill in the art are aware of the methods for creating XML Schemas. However, while the problem of how to create an XML Schema has been addressed, the problem of when to create an XML Schema remains relatively unaddressed. For example, the prior art method for creating XML Schema is to create the XML Schema at the discretion of the database administrator. While this method is adequate for a skilled database administrator, there is often a need to automate the XML creation process so that the database administrator will not have to constantly monitor the database. The prior art automation of this method is to create a new XML Schema upon regular intervals (i.e. once every ten minutes). In other words, the prior art method is to create a new XML Schema regardless of whether a new XML Schema is necessary or not.

The prior art automated method, while adequate, utilizes an excessive amount of computer resources to generate the new but unnecessary XML Schemas. A new XML Schema is only necessary when there has been a change to the database (i.e. the addition of a new field, column, or table). Therefore, it would be advantageous to determine when a new XML Schema is required, and to then only create a new XML Schema when necessary. Consequently, what is needed beyond the prior art is a method for monitoring a database and creating a new XML Schema only upon the determination that a new XML Schema is necessary.

SUMMARY OF THE INVENTION

The present invention, which meets the needs identified above, is a method implementable within computer software. The software embodiment of the present invention comprises a Schema Generation Program (SGP) and Software Update Program (SUP). The SGP creates an initial XML Schema and copies the database into a hashtable. At the occurrence of a query interval, the SGP compares the database to the hashtable. The SGP may compare the whole database, the database metadata, or user designated tables in the database to the hashtable. If the database is identical to the hashtable, the SGP resets the query interval and repeats the comparison at the expiration of the next query interval. Alternatively, a database trigger may be used instead of the query interval and query clock to determine when the database has been modified. If the database and the hashtable are not identical, then the creation of a new XML Schema is necessary. In that case, the SGP deletes the old hashtable, stores a copy of the database as a new hashtable, and creates a new XML Schema for the database. Alternatively, the SGP can update the existing XML schema. The XML Schema is stored in the web server's virtual root so that a registered party may access the XML Schema and check the validity of a group of data before sending the data to the web server as a proposed addition to the database. The SUP notifies the registered parties of updates to the XML Schema.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "backend driven" or "backend management" shall mean the process of requiring data characteristics, parameters, or values to match the characteristic, parameter, or value criteria for a database.

As used herein, the term "computer" shall mean a machine having a processor, a memory, and an operating system, capable of interaction with a user or other computer, and shall include without limitation desktop computers, notebook computers, personal digital assistants (PDAs), web servers, handheld computers, and similar devices.

As used herein, the term "database" shall mean a computer file composed of records, each record containing tables and fields, and a set of operations for searching, sorting, recombining, and finding data within the fields.

As used herein, the term "hashtable" shall mean a computer file or memory allocation for storing a copy of a database, and in which the computer file or memory allocation is later compared to the database.

As used herein, the term "metadata" shall mean the structural, formatting, and type requirements for the database.

As used herein, the term "query" shall mean to compare a database to a hashtable and determine if the database is identical to the hashtable.

As used herein, the term "query interval" shall mean a time interval for querying a database.

As used herein, the term "validate" shall mean to check data against an XML Schema to determine if the data meets the requirements of the database records, tables, and fields.

As used herein, the term "XML Schema" shall mean a computer file containing a plurality of rules for validating data.

Figure 1:
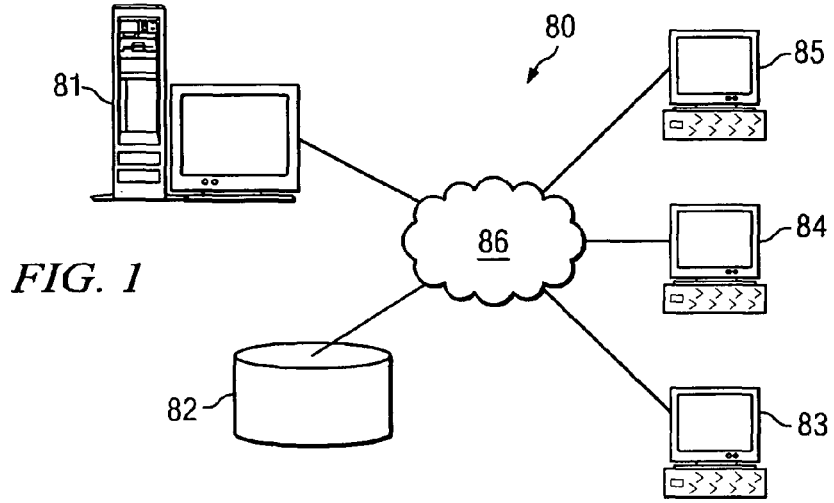
FIG. 1 is an illustration of a computer network used to implement the present invention.

FIG. 1 is an illustration of computer network 80 associated with the present invention. Computer network 80 comprises local computer 85 electrically coupled to network 86. Local computer 85 is electrically coupled to remote computer 84 and remote computer 83 via network 86. Local computer 85 is also electrically coupled to web server 81 and database 82 via network 86. Network 86 may be a simplified network connection such as a local area network (LAN) or may be a larger network such as a wide area network (WAN) or the Internet. Furthermore, computer network 80 depicted in FIG. 1 is intended as a representation of a possible operating network that may contain the present invention and is not meant as an architectural limitation.

Figure 2:
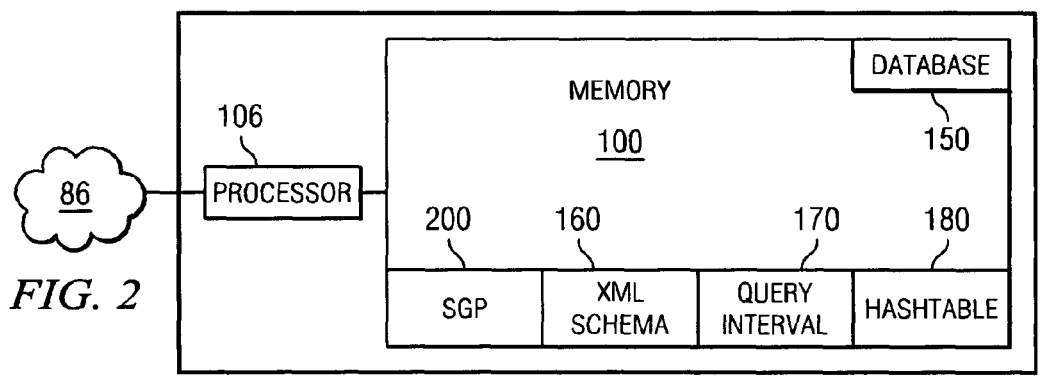
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Schema Generation Program (SGP) 200 and Schema Update Program (SUP) 400. SGP 200 and SUP 400 described herein can be stored within the memory of any computer depicted in FIG. 1. Alternatively, SGP 200 and SUP 400 can be stored in an external storage device such as a removable disk, a CD-ROM, or a USB storage device. Memory 100 is illustrative of the memory within one of the computers of FIG. 1. Memory 100 also contains database 150. The present invention may interface with database 150 through memory 100. SGP 200 and/or SUP 400 may produce XML Schema 160, query interval 170, and/or hashtable 180. As part of the present invention, the memory 100 can be configured with SGP 200 and/or SUP 400. Processor 106 can execute the instructions contained in SGP 200 and/or SUP 400. Processor 106 and memory 100 are part of a computer such as remote computer 83 in FIG. 1. SGP 200 and/or SUP 400 can communicate with other computers via network 86.

In alternative embodiments, SGP 200 and/or SUP 400 can be stored in the memory of other computers. Storing SGP 200 and/or SUP 400 in the memory of other computers allows the processor workload to be distributed across a plurality of processors instead of a single processor. Further configurations of SGP 200 and/or SUP 400 across various memories are known by persons of ordinary skill in the art.

Figure 3:
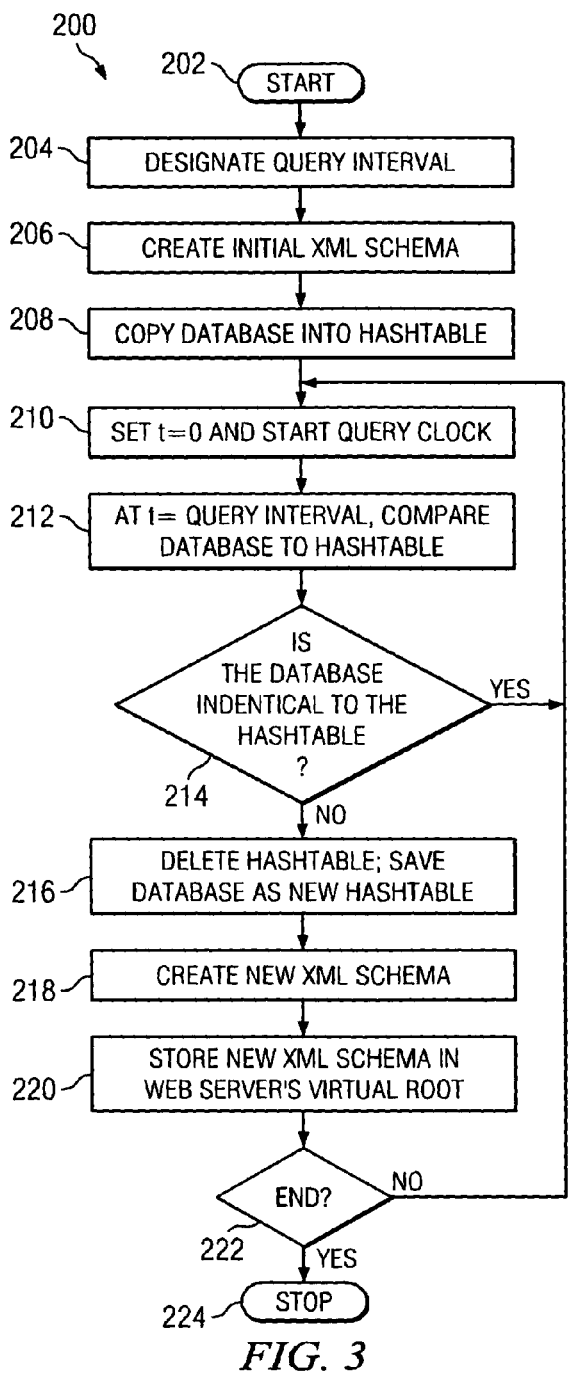
FIG. 3 is an illustration of the logic of the Schema Generation Program (SGP) of the present invention.

Turning to FIG. 3, the logic of Schema Generation Program (SGP) 200 is illustrated. SGP 200 is a program that monitors the database and generates a new XML Schema when the database has been changed. The database may be like database 150. SGP 200 starts (202) upon user command. For purposes herein, the user may be a database administrator or similarly qualified person. The user then designates the query interval (204). The query interval is the frequency with which SGP 200 queries the database. The query interval may be like query interval 170. Persons of ordinary skill in the art will appreciate that decreasing the query interval will lead to a quicker response time in creating new XML Schemas. In other words, with a small query interval, a new XML Schema will be generated much faster after entry of a change to the database than is the case with a larger query interval. Persons of ordinary skill in the art will also appreciate that the increased responsiveness in creating the new XML Schema will be the result of an increased number of comparisons between the database and the hashtable.

SGP 200 then creates the initial XML Schema (206). The XML Schema may be like XML Schema 160. The XML Schema is created by analyzing the database metadata and extracting the information regarding the data type, structure, size, and other rules regarding the validity of the data. SGP 200 uses the information and rules to construct the XML Schema. If the database is backend driven, the XML Schema is used to analyze proposed additions to the database to determine if the data in the proposed addition meets the database requirements. In other words, if the data in the proposed addition is validated by the XML Schema, then the data in the proposed addition will not cause an error in the database. The XML Schema is stored in the web server's virtual root so that outside parties can check the validity of proposed additions to the database and correct any deficiencies prior to sending the proposed addition to the database where the proposed addition is validated by the XML Schema. The XML Schema may include additional custom rules for validating data which are created by the user. Such custom rules can be included in the templates created by the present invention.

SGP 200 then copies the database into a hashtable (208). The hashtable may be like hashtable 180. Persons of ordinary skill in the art will appreciate that an array may be used in place of a hashtable. If the XML Schema is only concerned with certain tables within the database and not the entire database, then SGP 200 may copy only the pertinent database tables into the hashtable and compare the database tables to the hashtable in the subsequent steps. Further in the alternative, SGP 200 may copy only the database metadata into the hashtable and compare the database metadata to the hashtable in the subsequent steps. SGP 200 then sets the query clock to zero and starts the query clock (210). The query clock is a timer that counts up to the query interval. When the query clock reaches the query interval, SGP 200 compares the database to the hashtable (212).

SGP 200 then makes a determination whether the database is identical to the hashtable (214). If the database is identical to the hashtable, then SGP 200 proceeds to step 222. If the database and the hashtable are not identical, SGP 200 deletes the hashtable and saves a copy of the changed database as a new hashtable (216). SGP 200 then creates a new XML Schema using the method described in step 206 (218). As an alternative to steps 216 and 218, SGP 200 can update the existing XML schema. SGP 200 then stores the new XML Schema in the web server's virtual root (220). SGP 200 then makes a determination whether the user has ended the program (222). If the user has not ended the program, SGP 200 returns to step 210. If the user has ended the program, SGP 200 ends (224).

In an alternative embodiment, SGP 200 can be configured with a database trigger instead of a query interval and a query clock. A database trigger is a plug-in to the database that notifies the present invention when the database has been changed. However, in the event that a database trigger is used to indicate a change in the database, it is still desirable to compare the database to the hashtable to verify that a change has been made to the database.

Figure 4:
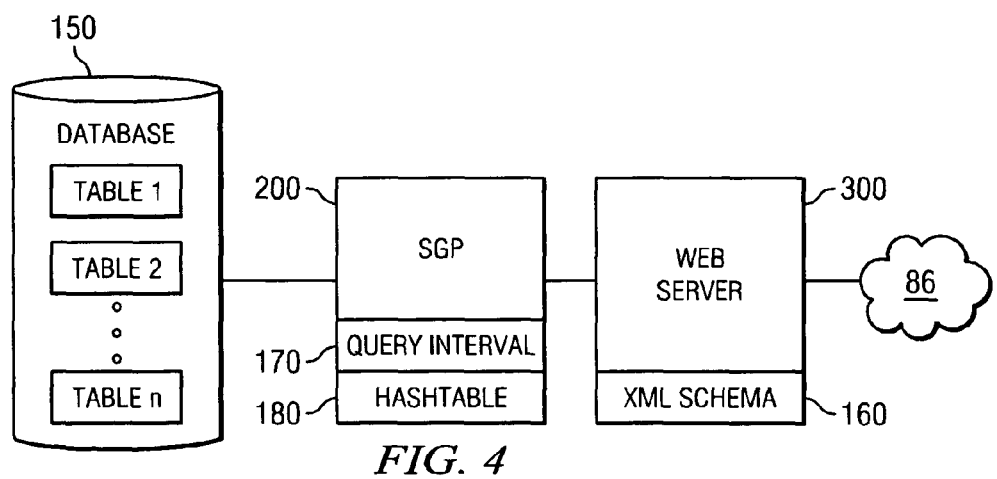
FIG. 4 is an illustration of the interaction of the SGP, the database, and the web server of the present invention.

Turning to FIG. 4, the connectivity of the present invention is illustrated. SGP 200 contains query interval 170 and hashtable 180. SGP 200 is connected to database 150 via a database connection pool or some other method known to persons of ordinary skill in the art. Database 150 may contain a plurality of tables. SGP 200 is also connected to web server 300, which contains XML Schema 160 and SUP 400. SUP 400 notifies registered parties of the updates to the XML Schema 160. Web server 300 is also connected to network 86, which may be the Internet. Storing XML Schema 160 in the web server's virtual root allows users to test the validity of proposed additions without actually submitting the proposed additions to the database. Additionally, the connectivity illustrated in FIG. 4 shows that SGP 200 and SUP 400 do not interfere with the normal processes occurring between web server 300 and database 150. In other words, SGP 200 and SUP 400 are using separate processes and do not block requests or responses between database 150, web server 300, and network 86.

The prior art of creating XML Schema updates involves the creation of a new XML Schema upon each and every occurrence of the query interval, or only as directed by the administrator. The present invention is an improvement over the prior art because the invention only creates a new XML Schema when a change is detected in the database (saving money) and the invention automates the process for the administrator (saving the administrator's time). Moreover, the invention will increase information technology cost-savings by reducing the number of scheduled maintenance and associated processes. The invention is unique because it creates an XML Schema when needed based upon the database metadata information by dynamically detecting changes in the database and making the necessary adjustments to the XML Schema.

Figure 5:
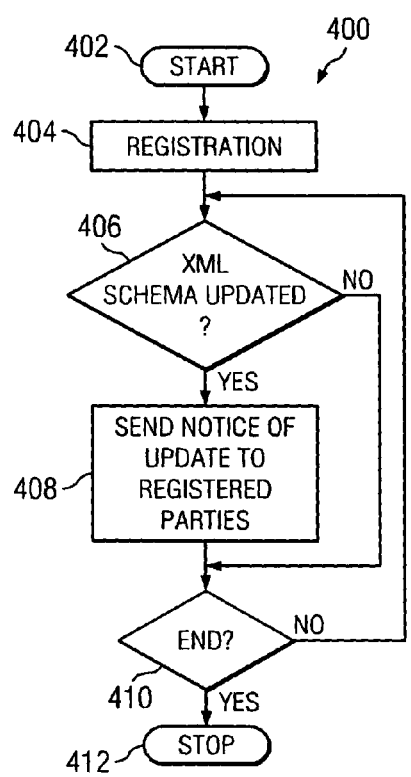
FIG. 5 is an illustration of the logic of the Schema Update Program (SUP) of the present invention.

Turning to FIG. 5, the logic of Schema Update Program (SUP) 400 is illustrated. SUP 400 is a program that notifies registered parties of the update to the XML Schema. SUP 400 starts (402) upon user command. Parties who wish to be notified of updates to the XML Schema may then register their email address with SUP 400 (404). SUP constantly monitors the XML Schema to determine if the XML Schema has been changed or updated. When SUP 400 determines that the XML Schema has been updated (406), SUP 400 sends notice of the updated XML Schema to the registered parties (408). Alternatively, SUP 400 could send the updated XML Schema itself to the registered parties. SUP 400 then determines if the user has indicated a desire to end SUP 400 (410). If the user has not ended SUP 400, SUP 400 returns to step 406. If the user has ended SUP 400, SUP 400 ends (412). As an alternative to SUP 400, the user can make the XML Schema available to anyone who needs to access the XML Schema.

The update program allows information technology (IT) administrators of registered parties to receive notice of current XML Schemas so that the administrators can schedule service on the database within an allotted time and successfully reactivate the system within the allotted time.

With respect to the above description, it is to be realized that the optimum dimensional relationships for the parts of the invention, to include variations in size, materials, shape, form, function and manner of operation, assembly and use, are deemed readily apparent and obvious to one of ordinary skill in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for validating a plurality of data in a backend driven environment, the method comprising the steps of:
    a computer creating an XML Schema for a database, wherein the XML Schema contains a plurality of rules for validating a plurality of data in the database;
    the computer copying the database to a hashtable;
    the computer designating a query interval;
    the computer, responsive to an occurrence of a query interval, comparing the database to the hashtable;
    the computer determining if the database and the hashtable are identical; and
    the computer, responsive to determining that the database and the hashtable are not identical:
        creating a new XML Schema, the creating the new XML Schema including automatically updating the plurality of rules;
        deleting the hashtable; and
        saving the database as a new hashtable; and
    wherein the new XML Schema is created only when a determination is made that the database and the hashtable are not identical.

2. The method of claim 1 further comprising:
    the computer, responsive to determining that the database and the hashtable are identical, resetting the query interval.

3. The method of claim 1 further comprising:
the computer storing the new XML Schema in a web server's virtual root.

4. The method of claim 1 wherein:
the step of copying the database to the hashtable comprises the computer copying a limited number of tables from the database to the hashtable; and
the step of comparing the database to the hashtable comprises the computer comparing a plurality of tables in the database to the tables in the hashtable.

5. The method of claim 1 wherein:
the step of copying the database to the hashtable comprises the computer copying database metadata to the hashtable; and
the step of comparing the database to the hashtable comprises the computer comparing the database metadata to the metadata in the hashtable.

6. The method of claim 1 further comprising:
the computer notifying a registered party of an update to the XML Schema.

7. A method for validating proposed additions to a database comprising:
a computer creating an XML Schema for the database;
the computer copying the database to a hashtable;
the computer designating a query interval;
responsive to an occurrence of the query interval, the computer comparing the database to the hashtable;
the computer determining if the database and the hashtable are identical;
responsive to determining that the database and the hashtable are not identical, the computer creating a new XML Schema for the database;
the computer accessing the new XML Schema stored in a web server's virtual root;
the computer checking the validity of the new XML Schema;
the computer validating the data using the new XML Schema;
the computer, responsive to a validation of the data, adding the data to the database; and
the computer notifying a registered party of an update to the XML Schema.

8. The method of claim 7 further comprising:
the computer, responsive to determining that the database and the hashtable are identical, resetting the query interval.

9. The method of claim 7 further comprising:
responsive to determining that the database and the hashtable are not identical, the computer deleting the hashtable and saving the database as a new hashtable.

10. The method of claim 7 further comprising:
the computer storing the new XML Schema in the web server's virtual root.

11. The method of claim 7 wherein:
the step of copying the database to the hashtable comprises the computer copying a limited number of tables from the database to the hashtable; and
the step of comparing the database to the hashtable comprises the computer comparing a plurality of tables in the database to the tables in the hashtable.

12. The method of claim 7 wherein:
the step of copying the database to the hashtable comprises the computer copying database metadata to the hashtable; and
the step of comparing the database to the hashtable comprises the computer comparing the database metadata to the metadata in the hashtable.

13. A program product operable on a computer, the program product comprising:
one or more computer-readable tangible storage devices;
program instructions, stored on at least one of the one or more computer-readable tangible storage devices, to create an XML Schema for a database, the XML Schema containing a plurality of rules for validating a plurality of data in the database;
program instructions, stored on at least one of the one or more computer-readable tangible storage devices, to copy the database to a hashtable;
program instructions, stored on at least one of the one or more computer-readable tangible storage devices, to designate a query interval;
program instructions, stored on at least one of the one or more computer-readable tangible storage devices, to compare the database to the hashtable in response to an occurrence of the query interval;
program instructions, stored on at least one of the one or more computer-readable tangible storage devices, to determine if the database and the hashtable are identical; and
program instructions, stored on at least one of the one or more computer-readable tangible storage devices, responsive to determining that the database and the hashtable are not identical, to create a new XML Schema, delete the hashtable, and save the database as a new hashtable; and
wherein the program instructions to create the new XML Schema automatically update the plurality of rules and create the new XML Schema only when a determination is made that the database and the hashtable are not identical.

14. The program product of claim 13 further comprising:
program instructions, stored on at least one of the one or more computer-readable tangible storage devices, responsive to determining that the database and the hashtable are identical, to reset the query interval.

15. The program product of claim 13 further comprising:
program instructions, stored on at least one of the one or more computer-readable tangible storage devices, to store the new XML Schema in a web server's virtual root.

16. The program product of claim 13 wherein:
the program instructions to copy the database to the hashtable copy a limited number of tables from the database to the hashtable; and
the program instructions to compare the database to the hashtable compare a plurality of tables in the database to the tables in the hashtable.

17. The program product of claim 13 wherein:
the program instructions to copy the database to the hashtable copy a database metadata to the hashtable; and
the program instructions to compare the database to the hashtable compare the database metadata to the metadata in the hashtable.

18. The program product of claim 13 further comprising:
program instructions, stored on at least one of the one or more computer-readable tangible storage devices, to notify a registered party of an update to the XML Schema.

19. A program product operable on a computer, the program product comprising:
one or more computer-readable tangible storage devices;
program instructions, stored on at least one of the one or more computer-readable tangible storage devices, to create an XML Schema for a database;

program instructions, stored on at least one of the one or more computer-readable tangible storage devices, to copy the database to a hashtable;

program instructions, stored on at least one of the one or more computer-readable tangible storage devices, to designate a query interval;

program instructions, stored on at least one of the one or more computer-readable tangible storage devices, responsive to an occurrence of the query interval, to compare the database to the hashtable;

program instructions, stored on at least one of the one or more computer-readable tangible storage devices, to determine if the database and the hashtable are identical;

program instructions, stored on at least one of the one or more computer-readable tangible storage devices, responsive to determining that the database and the hashtable are not identical, to create a new XML Schema for the database;

program instructions, stored on at least one of the one or more computer-readable tangible storage devices, to access the XML Schema stored in a web server's virtual root;

program instructions, stored on at least one of the one or more computer-readable tangible storage devices, to check a validity of using the new XML Schema;

program instructions, stored on at least one of the one or more computer-readable tangible storage devices, to validate the data using the new XML Schema;

program instructions, stored on at least one of the one or more computer-readable tangible storage devices, to add, responsive to a validation of the data, the data to the database; and program instructions, stored on at least one of the one or more computer-readable tangible storage devices, to notify a registered party of an update to the XML Schema.

20. The program product of claim 19 further comprising:

program instructions, stored on at least one of the one or more computer-readable tangible storage devices, responsive to a determining that the database and the hashtable are identical, to reset the query interval.

21. The program product of claim 19 wherein further comprising:

program instructions, stored on at least one of the one or more computer-readable tangible storage devices, responsive to determining that the database and the hashtable are not identical, to delete the hashtable and to save the database as a new hashtable.

22. The program product of claim 19 further comprising:

program instructions, stored on at least one of the one or more computer-readable, tangible storage devices, to store the new XML Schema in the web server's virtual root.

23. The program product of claim 19 wherein:

the program instructions to copy the database to the hashtable copy a limited number of tables from the database to the hashtable; and the program instructions to compare the database to the hashtable compare the database tables to the tables in the hashtable.

24. The program product of claim 19 wherein:

the program instructions to copy the database to the hashtable copy database metadata to the hashtable; and the program instructions to compare the database to the hashtable compare the database metadata to the metadata in the hashtable.

* * * * *